United States Patent
Lee

(10) Patent No.: US 7,278,043 B2
(45) Date of Patent: Oct. 2, 2007

(54) SYSTEM, METHOD, AND APPARATUS FOR OVERLOAD DETECTION IN REAL-TIME DATA PROCESSING APPLICATIONS

(75) Inventor: Way-Shing Lee, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 646 days.

(21) Appl. No.: 10/093,297

(22) Filed: Mar. 6, 2002

(65) Prior Publication Data

US 2003/0171826 A1 Sep. 11, 2003

(51) Int. Cl.
*G06F 1/00* (2006.01)
*G06F 1/04* (2006.01)
*G06F 1/12* (2006.01)
*G06F 5/06* (2006.01)
*G06F 15/16* (2006.01)

(52) U.S. Cl. .............. 713/400; 713/375; 713/401; 713/500; 713/501; 713/600

(58) Field of Classification Search ................ 713/400, 713/401, 375, 500, 501, 600
See application file for complete search history.

(56) References Cited

U.S. PATENT DOCUMENTS

| | | | |
|---|---|---|---|
| 5,623,647 A | | 4/1997 | Maitra ................ 395/556 |
| 5,870,545 A | * | 2/1999 | Davis et al. ............. 709/201 |
| 6,055,559 A | | 4/2000 | Shimizu et al. ........... 709/107 |
| 6,085,218 A | * | 7/2000 | Carmon ................... 718/107 |
| 6,212,208 B1 | * | 4/2001 | Yoneda et al. ............ 370/538 |
| 6,272,386 B1 | * | 8/2001 | McLaughlin et al. ........ 700/82 |
| 6,356,709 B1 | * | 3/2002 | Abe et al. ................. 386/117 |
| 6,519,733 B1 | * | 2/2003 | Har et al. ................. 714/758 |
| 6,694,010 B1 | * | 2/2004 | Verreault ................. 379/386 |
| 2001/0014609 A1 | * | 8/2001 | Yang ..................... 455/450 |

OTHER PUBLICATIONS

Young R. et al.: "Adaptrive Clock Speed Control for Variable Processor Loading" Motorola Techinical Developments, Motorola Inc., Schaumburg, Illinois, US; pp. 43-44, May 1, 1992.
Hull, D.L., et al: "Enhancing the Performance and Dependability of Real-Time Systems" Computer Performance and Dependability Symposium, 1995 Proceedings., International Erlangen, Germany; pp. 24-26; Los Alamitos, CA, USA, IEEE Comput. Soc, Apr. 24, 1995.

* cited by examiner

*Primary Examiner*—Rehana Perveen
*Assistant Examiner*—Michael J. Brown
(74) *Attorney, Agent, or Firm*—Howard H. Seo; Charles D. Brown; Thomas Rouse

(57) ABSTRACT

A method for overload detection according to one embodiment of the invention includes a control process and a data process. In response to a timing signal, the control process sets a state of a timing indicator. Upon execution of a time-constrained operation, the data process checks the state of the timing indicator. In other embodiments, subsequent to an overload detection, an auxiliary data process is configured to execute in a mode that consumes fewer processing cycles.

30 Claims, 14 Drawing Sheets

SYSTEM, METHOD, AND APPARATUS FOR OVERLOAD DETECTION IN REAL-TIME DATA PROCESSING APPLICATIONS

BACKGROUND

1. Field of the Invention

The present invention relates to data processing.

2. Background Information

In a real-time processing environment, a processor may be expected to complete one or more computational tasks no later than a certain time. For example, the processor may be expected to provide one or more computational results within a specified time period. Whether the processor executes the tasks sufficiently quickly to satisfy the time constraint may depend on factors such as the complexity of the tasks, the nature of the input, the design of the processor, and the rate at which the processor is clocked.

Some of these factors may be difficult or impossible to control at run time. For example, the design (e.g. the instruction set architecture) of the processor may be fixed during its manufacture. Other factors may be altered during system design. With other factors remaining constant, for example, the execution speed of a processor may be increased by increasing its clock frequency (within the physical limits of the particular processor).

One approach to real-time system planning is to determine (or estimate) the worst-case processing load and set the clock frequency accordingly. In some applications, however, it may be desirable to clock a processor at a rate that is less than would be required to satisfy the worst-case load. For example, power consumption is also related to clock frequency. Especially in process technologies such as CMOS (complementary metal-oxide-semiconductor), power dissipation increases strongly with clock frequency. In portable applications, the commercial viability of a particular design may depend on battery life, and selecting a worst-case rate for the processor clock may result in an unacceptable waste of available power.

In some applications, it may be desirable to use a clock source that is already available. In a portable wireless device, for example, one or more clock sources (e.g. oscillators) may already be present to generate signals used for radio-frequency operations such as modulation or demodulation. Using an available clock source may conserve chip area (e.g. by avoiding chip area consumption by an additional clock source and distribution network) and may also avoid or reduce the potential for interference between different clock sources.

Unfortunately, a clock source whose frequency is selected to reduce power consumption, or a clock source that is already available, may not provide adequate execution speed to satisfy the worst-case processing requirements. An overload condition occurs when a processing task does not complete when expected. In some applications, a resulting unavailability of data or conflict between tasks may cause an undesirable degradation of performance. It is desirable to reduce or avoid degradation in a system where an overload condition may occur.

In other applications, unavailability of data or conflict between tasks may lead to an invalid or undefined operation or may otherwise cause a system to become unstable. It is desirable to avoid unstable operation in a system where an overload condition may occur.

SUMMARY

A method of process control according to one embodiment of the invention includes setting a state of a timing indicator upon detecting a predetermined feature of a timing signal. For example, the predetermined feature may be a specified state transition such as a rising or falling edge. In some implementations, the timing signal may be generated by a process or by a device such as an oscillator, and the timing indicator may be implemented as a binary or multi-valued flag and/or as one or more bits of a status word stored in a processor register or other memory location.

Such a method also includes executing a process, and checking the state of the timing indicator upon completion of a predetermined stage of the executing. In one example, the checking occurs when executing the process is completed. A method according to another embodiment of the invention includes setting the state of a status indicator upon completion of the executing. A method according to yet another embodiment of the invention includes executing an auxiliary process in a predetermined mode of execution based on the state of the timing indicator.

An apparatus according to an embodiment of the invention includes a control module, a processing module, and an auxiliary processing module. The control module is configured and arranged to set a state of a timing indicator upon detecting a predetermined feature of a timing signal. The processing operation is configured and arranged to execute a second data operation and to check the state of the timing indicator upon completion of a predetermined stage of the second data operation. The auxiliary processing module is configured and arranged to execute a first data operation in a predetermined mode of execution based on the state of the timing indicator.

The invention is not limited to or restricted by the features presented in the above summary, as other embodiments of the invention and implementations and applications thereof are described herein.

DETAILED DESCRIPTION

The word "exemplary" is used exclusively herein to mean "serving as an example, instance, or illustration." Any embodiment, arrangement, or application described herein as "exemplary" is not necessarily to be construed as preferred or advantageous over other embodiments, arrangements, or applications.

In a real-time system, a data process may be expected to complete the production (or, alternatively, the consumption) of a quantity of data within a specified period of time (or by a certain moment of time). In an application such as wireless transmission or video display, for example, a transmitting or display process may expect an upstream data process (e.g. a codec) to produce packets or frames of data according to a fixed schedule. Similarly, in an application such as wireless reception or video capture, a receiving or capture process may expect a downstream data process (e.g. a codec) to consume packets or frames of data according to a fixed schedule. Consequences of a failure to meet such time constraints may range from transient degradation of system performance to a complete failure of the system.

Figure 1:
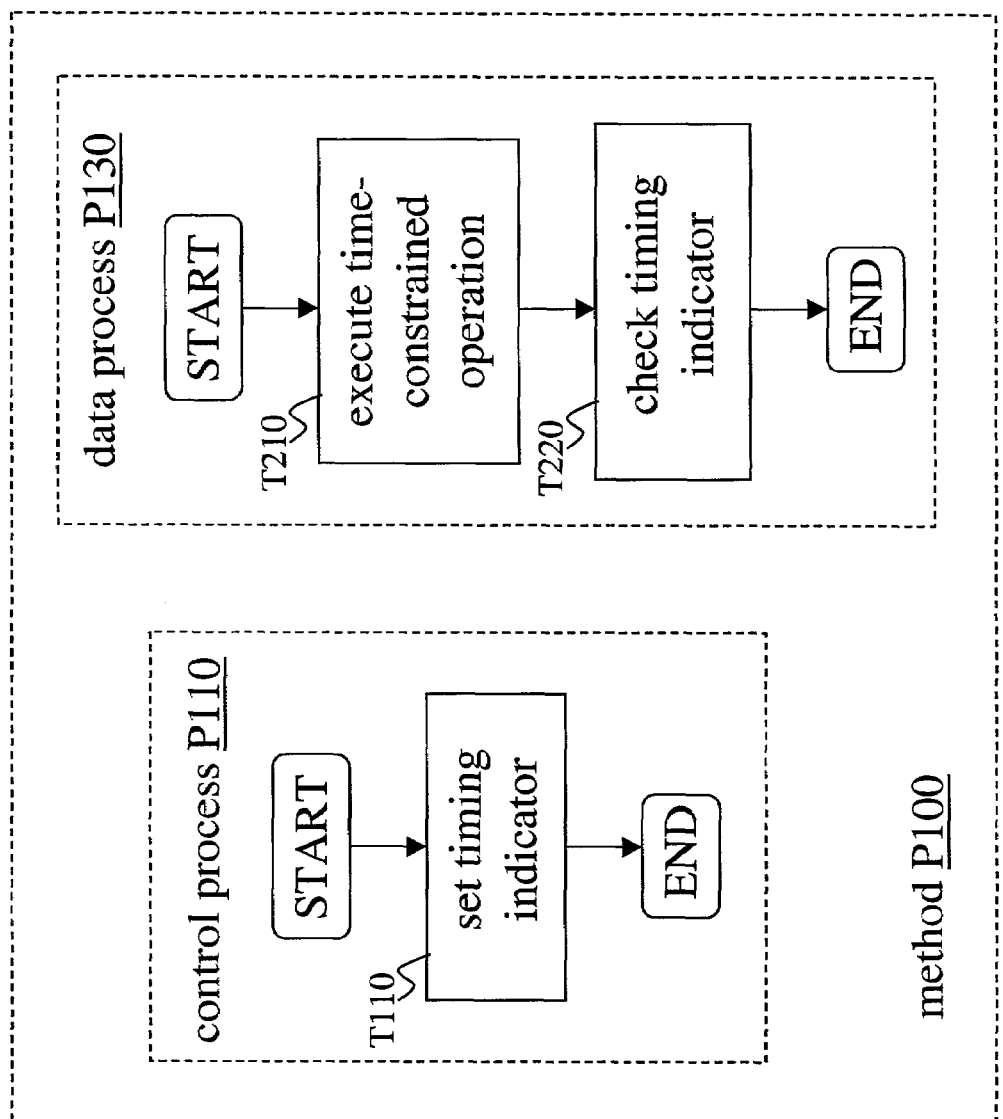
FIG. 1 is a block diagram of an apparatus 100 according to an embodiment of the invention.

FIG. 1 shows a flowchart for a method of overload detection P100 according to an embodiment of the invention. Method P100 includes two processes: control process P110 and data process P130. In control process P110, task T110 sets a state of a timing indicator accessible to control process P110 and data process P130. The timing indicator may be implemented as a binary or multi-valued flag. For example, the timing indicator may include one or more bits of a status word stored in a processor register or other memory location.

In an exemplary application, control process P110 executes in response to a specified state transition (e.g. a rising edge) of a timing signal of predetermined frequency. In the particular example of a cellular telephone, a stream of speech data is divided into consecutive frames (having a duration of e.g. twenty milliseconds), and control process P110 executes in response to a timing signal that indicates boundaries between frames. In such case, the timing signal may be generated by an external process or a device such as an oscillator or counter (not shown). In an exemplary implementation, control process P110 is an interrupt service routine that executes in response to an interrupt request from a process or device (not shown).

In data process P130, task T210 executes a time-constrained operation. In an exemplary application, the time-constrained operation is expected to produce and/or consume a quantity of data within a specified period or by a certain moment. In the particular example of a cellular telephone, the time-constrained operation may be a vocoding operation that encodes a frame of speech data for transmission. In a video display example, task T210 may include a decompression operation that decodes a quantity of video data for display.

Upon completion of task T210, task T220 checks the state of the timing indicator. If task T220 finds that the state of the timing indicator has not yet been set (e.g. by control process P110), then data process P130 has satisfied the time constraint. Otherwise, if task T220 finds that the state of the timing indicator has already been set (e.g. by control process P110), then data process P130 has suffered an overload.

Actions taken in response to detection of an overload in task T220 may include increasing a priority of the time-constrained operation, and/or using a less complex mode of operation (e.g. a reduced compression ratio or a reduced-quality decompression procedure), in a subsequent iteration of task T210. Depending on the nature of task T210 and related tasks and/or processes, an output of task T210 for an iteration in which an overload condition is detected may be discarded.

Task T220 may include resetting the state of the timing indicator (i.e. after the state has been checked). Alternatively, resetting of the state of the timing indicator may occur at any time between completion of task T220 and the earliest among commencement of the next iteration of task T110 and completion of the next iteration of task T210. In another application, another task or process (not shown) may reference (and reset) the state of the timing indicator after task T220 has completed.

In an exemplary implementation, control process P110 and data process P130 include sequences of instructions executable on a programmable array of logic elements such as a microprocessor or digital signal processor (DSP), and timing indicator 120 includes a location within the register or memory space of the array.

Figure 2:
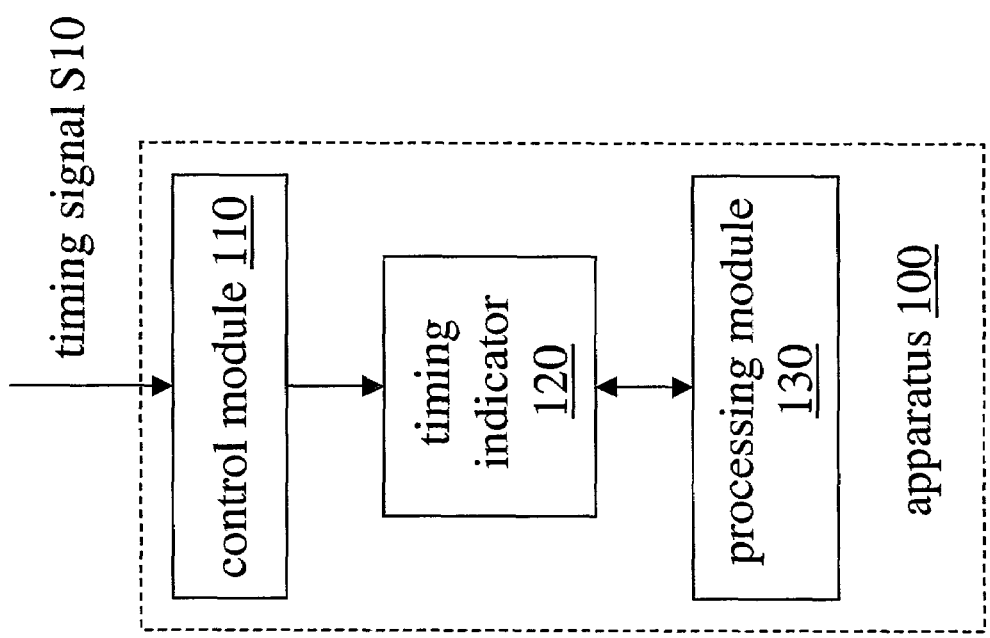
FIG. 2 is a flowchart of a method P100 according to an embodiment of the invention.

FIG. 2 shows a block diagram for an apparatus 100 according to an embodiment of the invention. Upon receiving a specified state transition of a timing signal S10, control module 110 sets a state of a timing indicator 120. Upon completing a processing task, processing module 130 checks the state of timing indicator 120. Subsequent to checking the state of timing indicator 120, module 130 may also reset the state of indicator 120, or another module (not shown) may reference (and reset) the state of the indicator.

In an exemplary implementation, control module 110 includes a programmable array of logic elements such as a microprocessor or digital signal processor (DSP) executing a sequence of instructions, processing module 130 includes the same programmable array executing a different sequence of instructions, and timing indicator 120 includes a location within the register or memory space of the array. In another implementation, one or both of control module 110 and processing module 130 includes an array of logic elements fabricated into an application-specific integrated circuit (ASIC) or programmed into a field-programmable gate array (FPGA).

Figure 3:
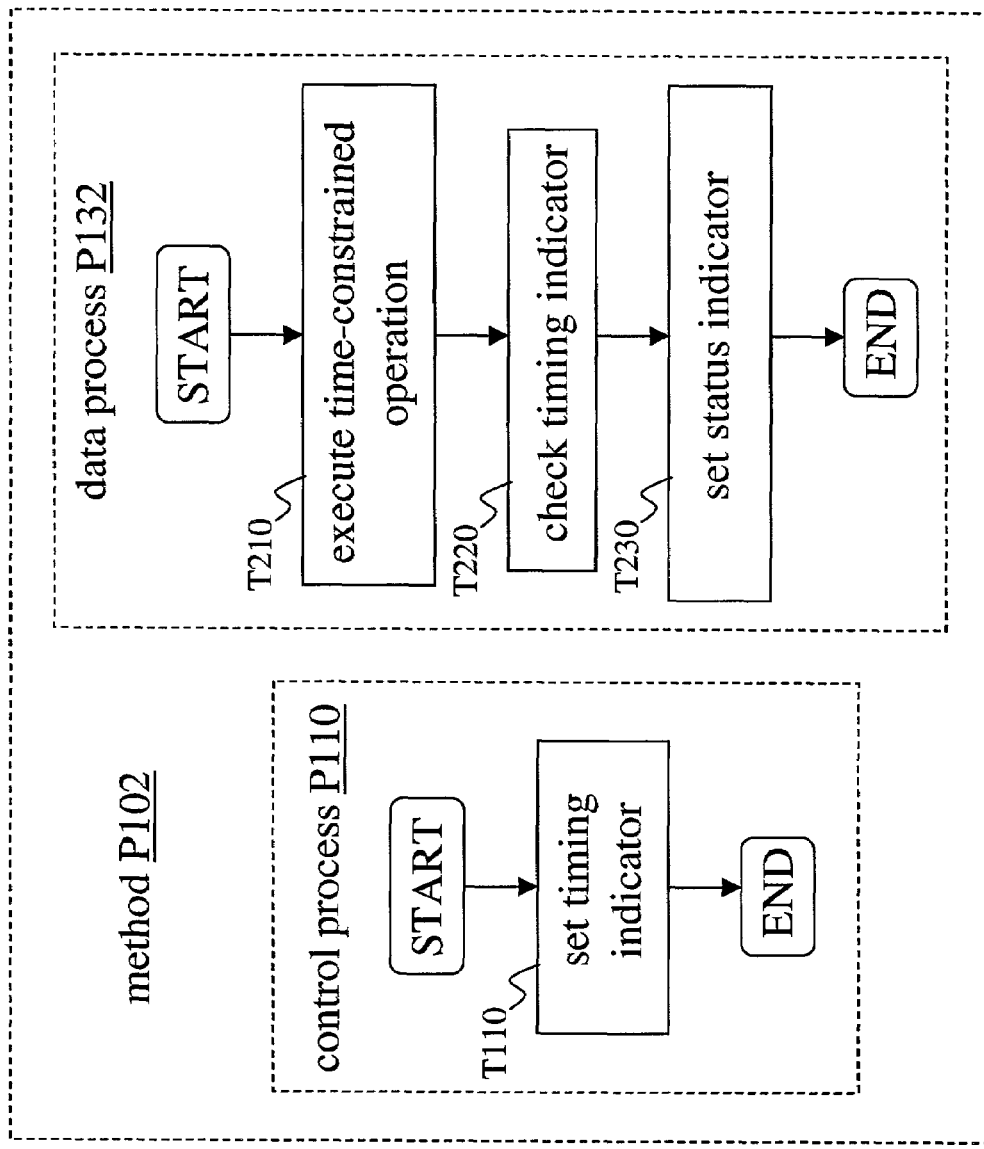
FIG. 3 is a block diagram of an implementation 102 of apparatus 100 according to an embodiment of the invention.

FIG. 3 shows a flowchart for an implementation P102 of method P100. Method P102 includes two processes: control process P110 and data process P132. In data process P132, upon completion of task T210, task T230 sets a state of a status indicator. In this implementation, data process P132 sets a state of the status indicator according to a result of task T220, such that the status indicator indicates [e.g. to other tasks of process P132 (not shown) and/or to another process or device] whether the time-constrained operation of task T210 was completed within the specified constraint.

The status indicator may include a binary or multi-valued flag accessible to data process P132 and possibly to another process or device. For example, the status indicator may include one or more bits of a status word stored in a processor register or other memory location (which status word may also include the timing indicator).

In another implementation, the status indicator indicates a location (e.g. a port or memory address) at which an output of task T210 and/or of process P132 may be found. In this case, when an overload condition occurs such that the output of task T210 is not yet available, task T230 may set the status indicator to indicate a location at which a default output (e.g. a predetermined constant string) may be found. Such an implementation may be desirable in applications where passing an incomplete result to a subsequent process or task may cause instability.

In an exemplary application, control process P110 serves a quantity (e.g. a packet) of data produced by task T210 to another process or device (not shown) upon receiving the timing signal and according to the state of the status indicator. Alternatively, control process P110 may accept a quantity of data as input to task T210 from such a process or device at such a time and according to the state of the status indicator.

Depending on the nature of task T210 and related tasks and/or processes, an output of task T210 for an iteration in which an overload condition is detected may be discarded. Alternatively, a process or device that consumes output from (or supplies input to) task T210 may operate with some fixed or variable leniency with respect to the timing signal. In such case, it may be possible under limited circumstances for such a process or device to consume output from (or supply input to) task T210 even when an overload condition has been detected.

In the particular example of a cellular telephone in which task T210 includes a vocoding operation, task T230 may set the status indicator to indicate a location at which a null packet (e.g. a predetermined constant string) may be found. In another application, the status indicator may include a location at which an input to task T210 and/or of process P132 should be directed, such that in case of overload, task T230 sets the status indicator to indicate a default location to which an input should be directed.

Figure 4:
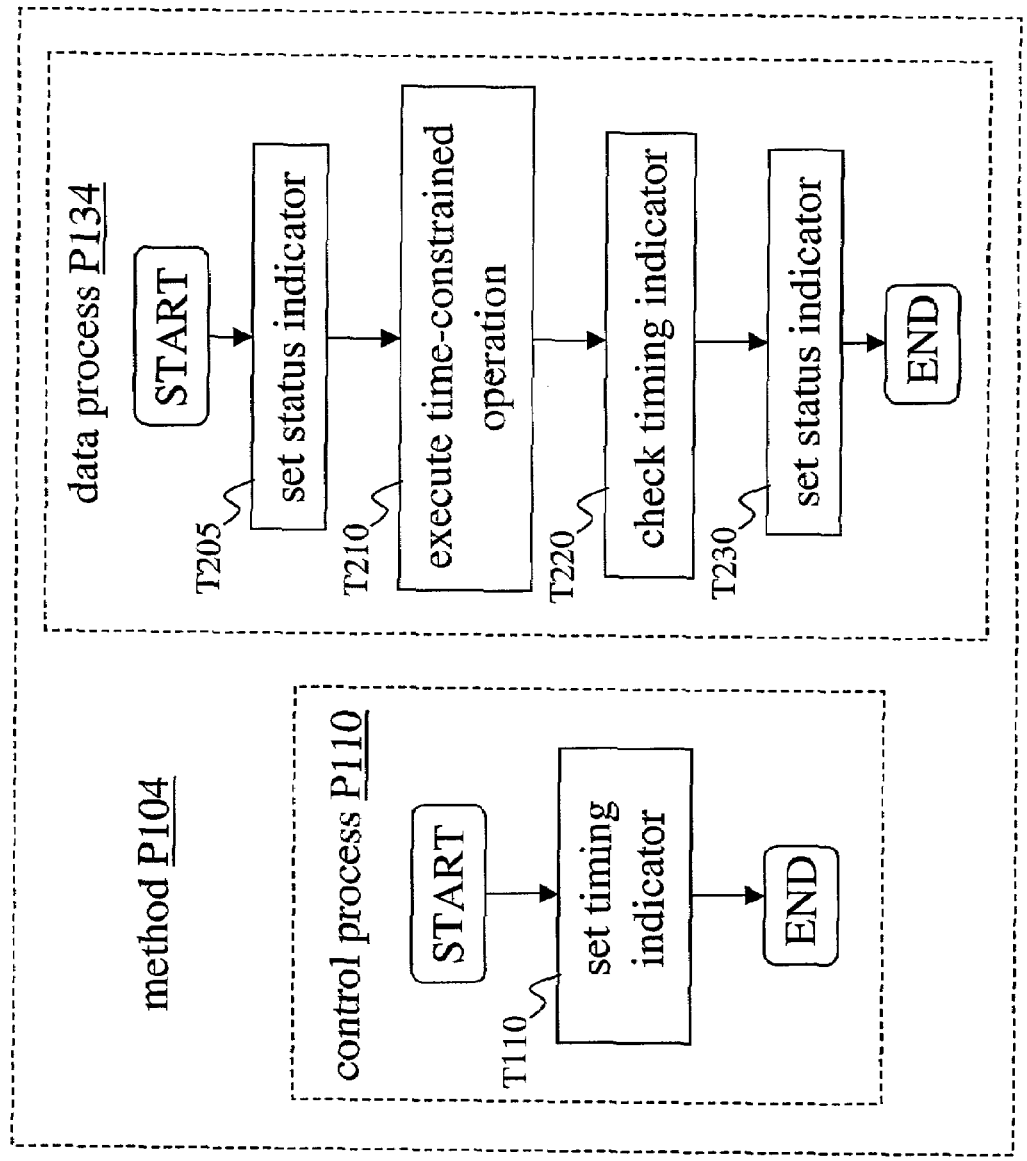
FIG. 4 is a flowchart of an implementation P102 of method P100 according to an embodiment of the invention.

FIG. 4 shows a flowchart for an implementation P104 of method P100. Method P104 includes two processes: control process P110 and data process P134. In data process P134, task T205 sets a state of the status indicator before execution of task T210 begins. In an exemplary application, task T205 sets the status indicator to a state indicating overload, and task T230 sets the status indicator to a state indicating absence of overload. In another application, task T205 sets the status indicator to a state indicating incompletion of task T210, and task T230 sets the status indicator to a state indicating completion of task T210. In either case, when the time condition indicated by the timing indicator occurs, a process or device may read the state of the status indicator and determine whether task T210 has completed within the specified constraint. Alternatively, the process or device may retrieve data from (and/or store data to) an appropriate location based on the state of the status indicator.

Figure 5:
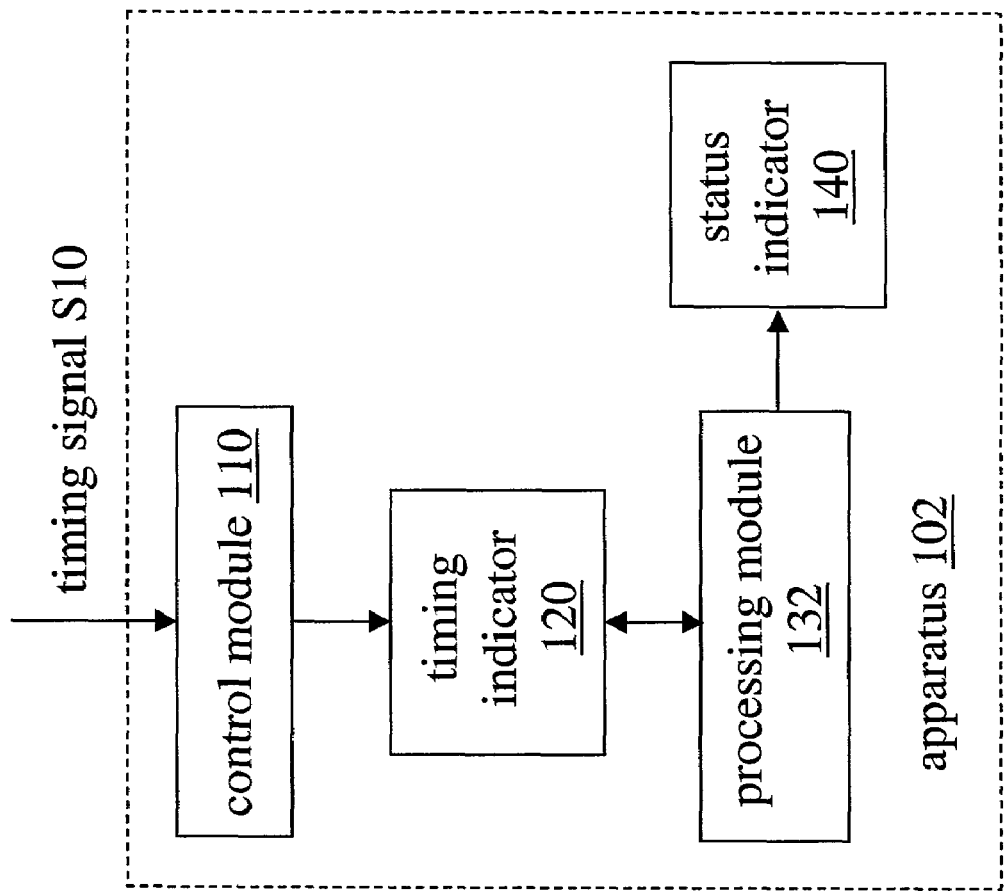
FIG. 5 is a block diagram of an apparatus 200 according to an embodiment of the invention.

FIG. 5 shows a block diagram for an implementation 102 of apparatus 100. Upon completion of a processing task, processing module 132 sets a state of a status indicator 140 according to the current state of timing indicator 120. Processing module 132 may also set the state of the status indicator (e.g. to an initial state) before beginning the processing task.

In a real-time processing environment, several data processes may contribute to a single result. These processes may execute concurrently and/or consecutively. For example, in a method according to an embodiment of the invention as described herein, the time-constrained operation of task T210 may operate on a result produced by another process or task and/or may provide an intermediate result to another process or task.

Figure 6:
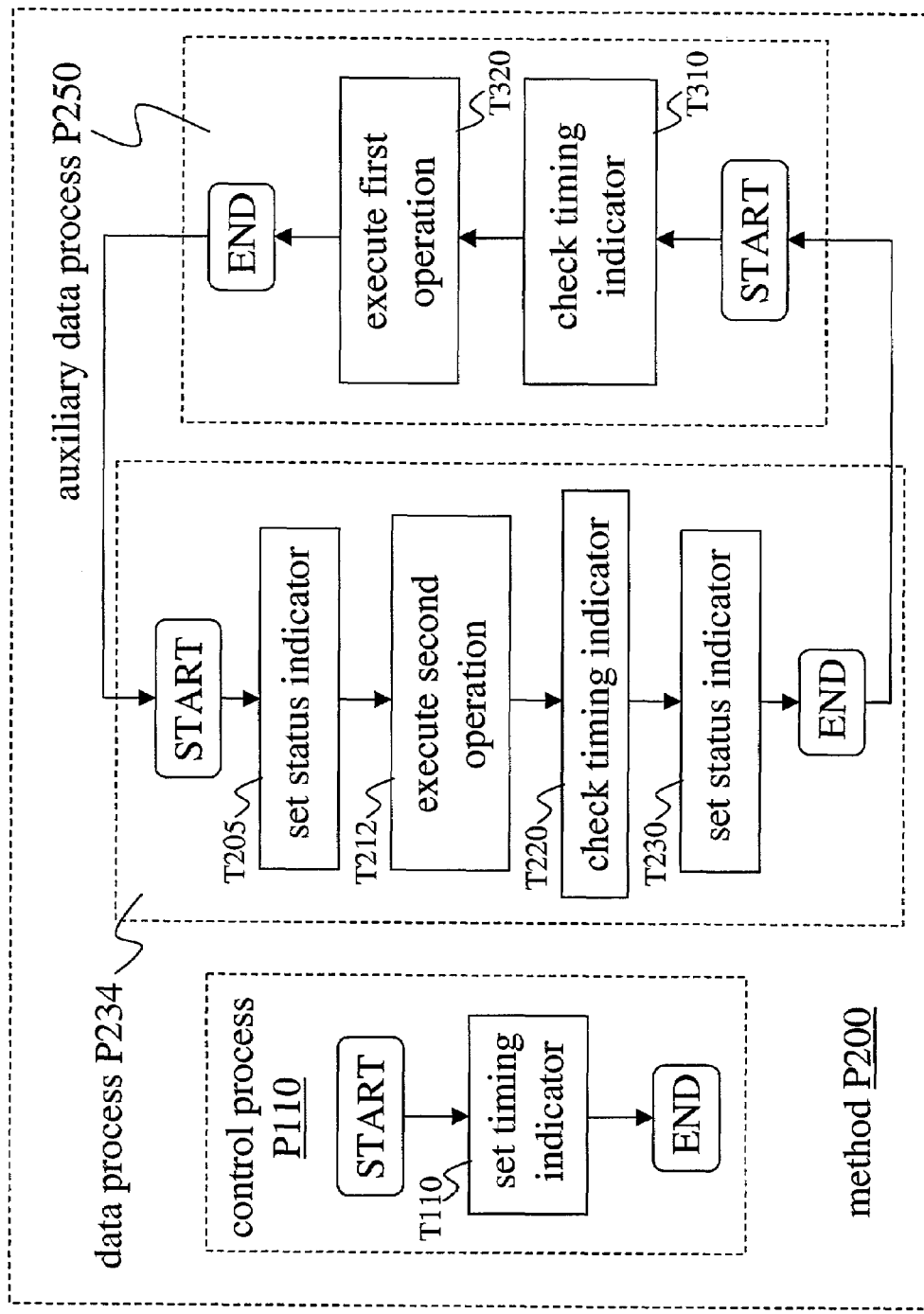
FIG. 6 shows a flowchart for a method P200 according to an embodiment of the invention.

FIG. 6 shows a flowchart for a method P200 according to an embodiment of the invention. Method P200 includes three processes: control process P110, data process P234, and auxiliary data process P250. In data process P234, task T212 executes a second operation (e.g. a time-constrained operation as described above). In auxiliary data process P250, task T310 checks the state of the timing indicator, and task T320 executes a first operation according to the state of the timing indicator.

In an exemplary implementation, the second operation of task T212 is related to or even contingent on the first operation of task T320. For example, a result of the second operation may depend at least partially on a result of the first operation.

Although FIG. 6 shows that task T212 follows task T320, in another implementation the two tasks may be performed in reverse order or simultaneously. Even in a case where the second operation is contingent on the first operation, an initial state may be provided for the first operation such that the second operation may execute first.

In this example, the first operation of task T320 executes in one of at least two different modes: a restricted mode and an unrestricted mode. When in the restricted mode, the first operation consumes fewer processing cycles than when in the unrestricted mode, thus reducing the total processing load. In another example, the first operation of task T320 may execute in one of several priority modes (e.g. with respect to a set of processor interrupts).

If task T310 determines that the timing indicator is set, then task T212 of data process P234 exceeded the given time constraint on the preceding iteration. In this case, task T310 resets the state of the timing indicator and the first operation executes in the restricted mode. This dynamic reallocation of processing cycles from the first operation to the second operation may enable the second operation to complete the execution of a subsequent iteration within the specified time constraint. If task T310 determines that the timing indicator is not set, then the first operation executes in the unrestricted mode.

In one particular example of a cellular telephone, the first operation of task T320 is an echo-canceling operation that cancels acoustic echo in a hands-free device attached to the telephone. This echo-canceling operation has two parts. One part includes a channel learning process that analyzes voice energy in the acoustic channel (which may contain a reflected echo) and updates a stored representation of the channel. The other part includes a canceling process that applies the stored representation to a quantity of speech data. In the unrestricted mode, both of these processes are active. In the restricted mode, the channel learning process is suspended (i.e. the stored representation is not updated), and only the canceling process is active. In one such example, updating of the stored representation may be suspended for a short period without substantial degradation of system performance.

Figure 7:
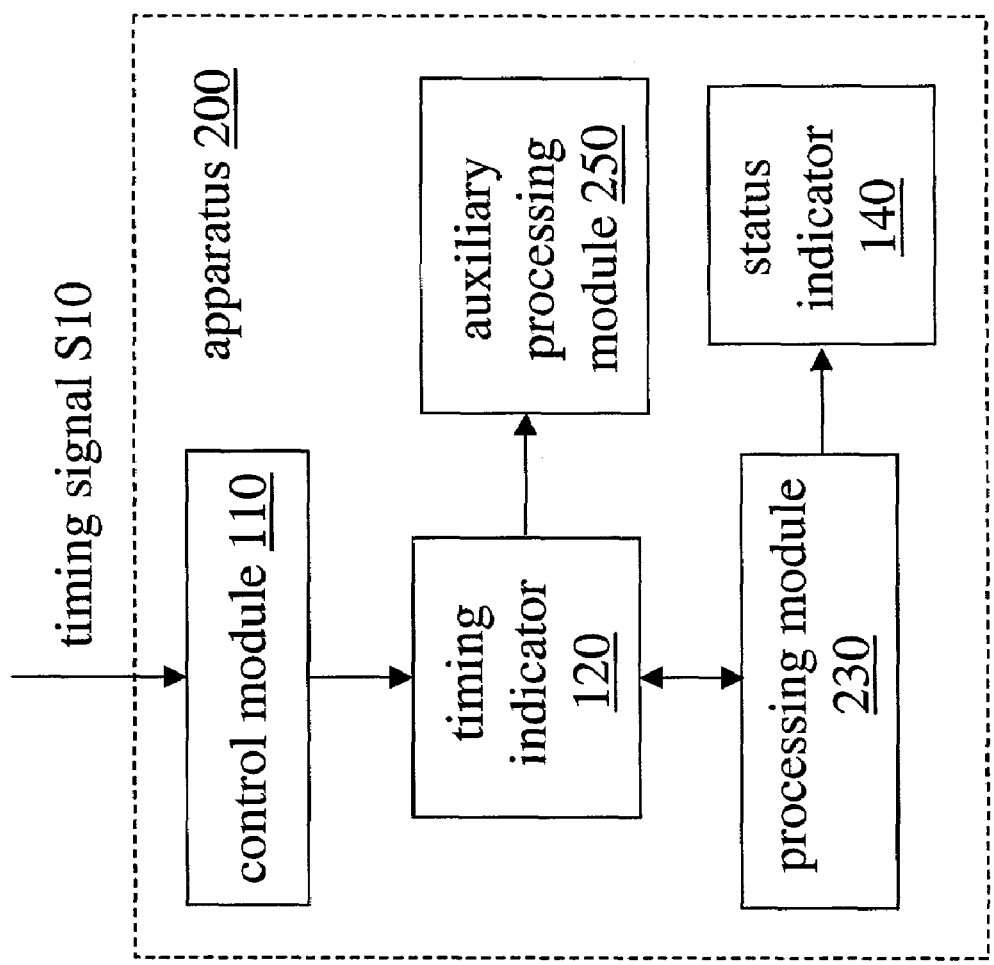
FIG. 7 shows a block diagram for an apparatus 200 according to an embodiment of the invention.

FIG. 7 shows a block diagram for an apparatus 200 according to an embodiment of the invention. Auxiliary processing module 250 executes a first data operation according to the current state of timing indicator 120. Auxiliary processing module 250 may also reset the state of timing indicator 120 (e.g. to an initial state) if it determines that the state is set.

Upon completion of a second data operation (e.g. a time-constrained operation), processing module 230 sets a state of a status indicator 140 according to the current state of timing indicator 120. Processing module 230 may also set the state of the status indicator (e.g. to an initial state) before beginning the first data operation.

In an exemplary implementation, processing module 230 includes a programmable array of logic elements such as a microprocessor or digital signal processor (DSP) executing a sequence of instructions, and auxiliary processing module 250 includes the same programmable array executing a different sequence of instructions. In another implementation, one or both of processing module 230 and auxiliary processing module 250 includes an array of logic elements fabricated into an application-specific integrated circuit (ASIC) or programmed into a field-programmable gate array (FPGA).

Figure 8:
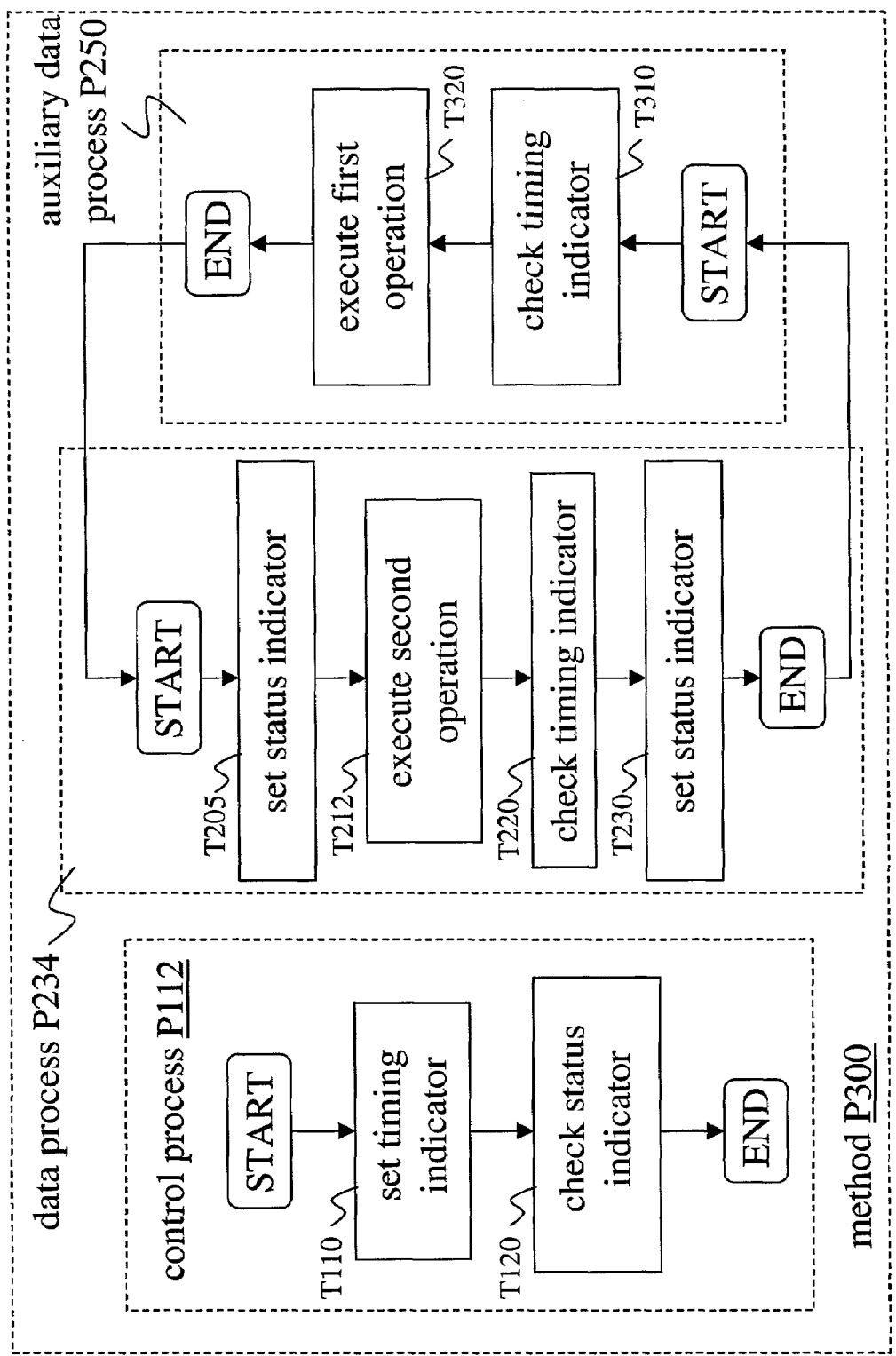
FIG. 8 shows a flowchart for a method P300 according to an embodiment of the invention.

FIG. 8 shows a flowchart for a method P300 according to an embodiment of the invention. Control process P112 includes task T120, which checks the state of the status indicator. In an exemplary application, task T120 serves a quantity (e.g. a packet) of data produced by task T212 to another process or device (not shown) according to the state of the status indicator. In one such application, task T120 serves the data to another processor (or to a process executing on the same processor or a different processor) for further processing operations. In the particular example of a cellular telephone, task T120 serves a vocoded packet to another process or device for further operations related to transmission (such as error-correction coding and interleaving). Alternatively, task T120 may accept a quantity of data as input to task T212 from such a process or device according to the state of the status indicator.

Figure 9:
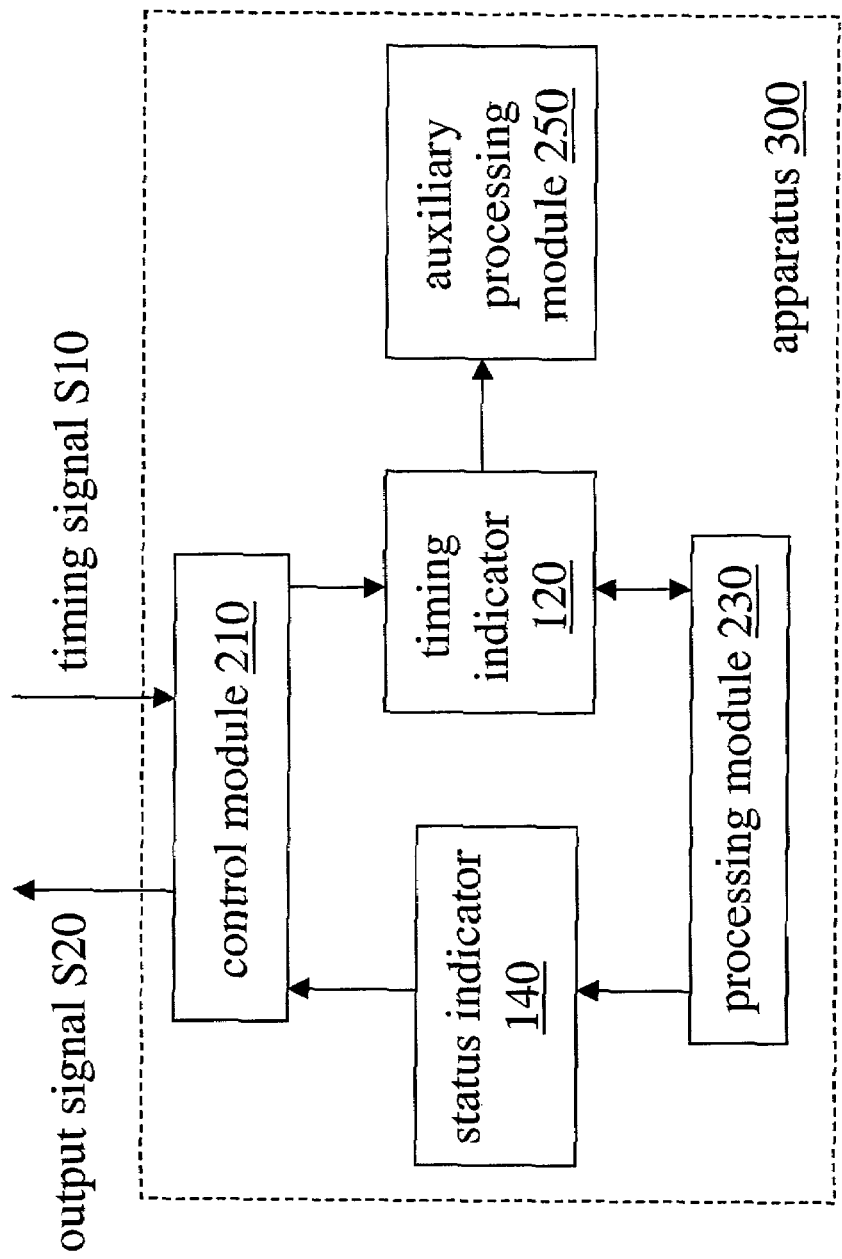
FIG. 9 shows a block diagram for an apparatus 300 according to an embodiment of the invention.

FIG. 9 shows a block diagram for an apparatus 300 according to an embodiment of the invention. Upon receiving a specified state transition of a timing signal S10, control module 210 sets a state of timing indicator 120 and checks a state of status indicator 140. In an exemplary application, control module 210 serves a quantity (e.g. a packet) of data produced by processing module 230 via output signal S20 to another process or device (not shown) according to the state of the status indicator. In an alternative application, control module 210 accepts a quantity of data as input to processing module 230 from another process or device according to the state of the status indicator.

In an exemplary implementation, control module 210 includes a programmable array of logic elements such as a microprocessor or digital signal processor (DSP) executing a sequence of instructions, and processing module 230 and auxiliary processing module 250 include the same programmable array executing different sequences of instructions. In another implementation, one or more of control module 110, processing module 130, and auxiliary processing module 250 include an array of logic elements fabricated into an application-specific integrated circuit (ASIC) or programmed into a field-programmable gate array (FPGA).

The first and second data operations as described above may tend to be complementary, with one being more active when the other is less active. For example, the second data operation may be a vocoder for a cellular telephone, and the first data operation may be an acoustic echo canceller for a hands-free device (e.g. a device including a microphone and speaker designed to be worn by the user and/or to be mounted in proximity to the user) that is connected (electrically or via a wireless link) to the cellular telephone.

In such an arrangement, the vocoder may tend to be more active (i.e. requires more processing cycles to complete) as the level of voice activity in the channel increases. A period of silence, for example, may be encoded at a lower rate than a period of speech. On the other hand, the echo canceller may tend to be more active when the channel is constant (e.g. silent), as the training operation executes to characterize the channel, and to become less active as the level of voice activity in the channel increases.

In such a case, where one operation is relatively active when the other operation is relatively inactive, a clock rate that is less than the worst-case requirement may be adequate to avoid overload conditions in most circumstances. When an overload situation does occur in such a situation (e.g. when one operation becomes active before the other has become inactive), it may be expected to be transient. In applying a method or apparatus according to an embodiment of the invention to such a system, it may be appropriate to allow the system to return quickly (e.g. at the next iteration of the data operations) to unrestricted operation.

In an alternative application, the first and second data operations may tend to be supplementary, with the level of activity of both tasks rising and falling together. In yet other situations, the activity levels of the first and second data operations may tend to be independent of one another. In such cases, it may be desirable to provide for several modes of operation (e.g. each having a different processing load) for one or both of the first and second data operations. As an alternative to (or in addition to) providing for different modes of operation, it may be desirable to control a rate of a data operation with reference to a current or previous rate of that data operation and/or of another data operation.

Figure 10:
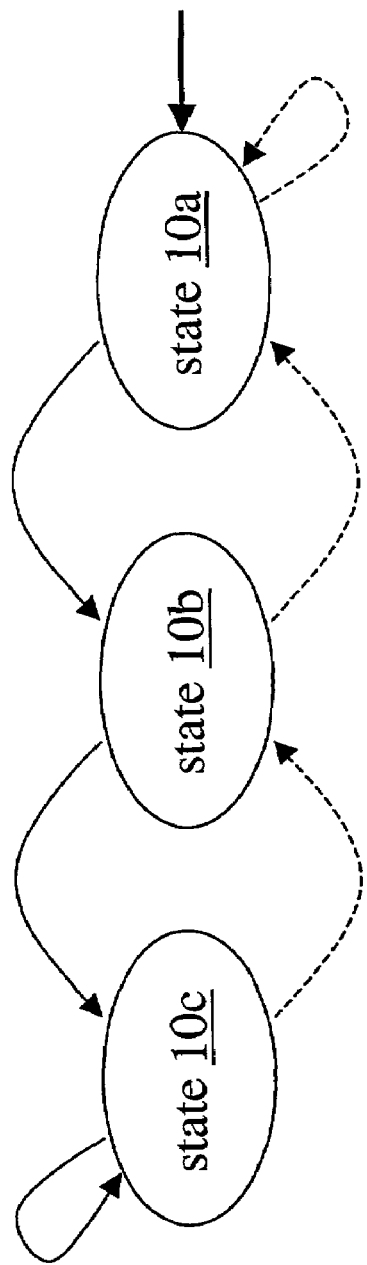
FIG. 10 shows a block diagram for an implementation 304 of apparatus 300.

In some applications, an overload situation may have varying degrees of severity. It may be desirable in such cases for the current rate to be based in part on previous rates or states of the system. FIG. 10 shows a state diagram of an exemplary system including a method or apparatus as described herein that provides for different processing rates according to a history of system operation. In initial state 10a, the system is configured such that the controlled data operation executes at an unrestricted rate. If an overload condition is detected, the system moves to state 10b, in which the controlled data operation is configured to execute at a reduced rate. If no overload condition is detected, the system remains in state 10a.

If an overload condition is detected while the system is in state 10b, then the system moves to state 10c, in which the controlled data operation is configured to execute at a more reduced rate. Otherwise, the system returns to state 10a. If no overload condition is detected when the system is in state 10c, the system returns to state 10b. In this example, no further states are included, and the system remains in state 10c if an overload condition is detected.

In a further example, a state other than state 10a is the initial state. In another example, a rate of a different data operation, or of more than one data operation, may change from one state to another. In another example, detection of an overload condition when the system is in the most restricted state indicates an error condition and initiates another process (for example, an error-logging, error-handling, and/or error recovery process).

In other applications, an overload situation may be expected to last for more than one iteration of the first and second data operations. In such a case, returning to an unrestricted rate after each overload detection may lead to another overload condition, resulting in a thrashing between the restricted and unrestricted rates. In this and other situations, it may be desirable to delay the recovery of the processing rates of one or more data operations.

Figure 11:
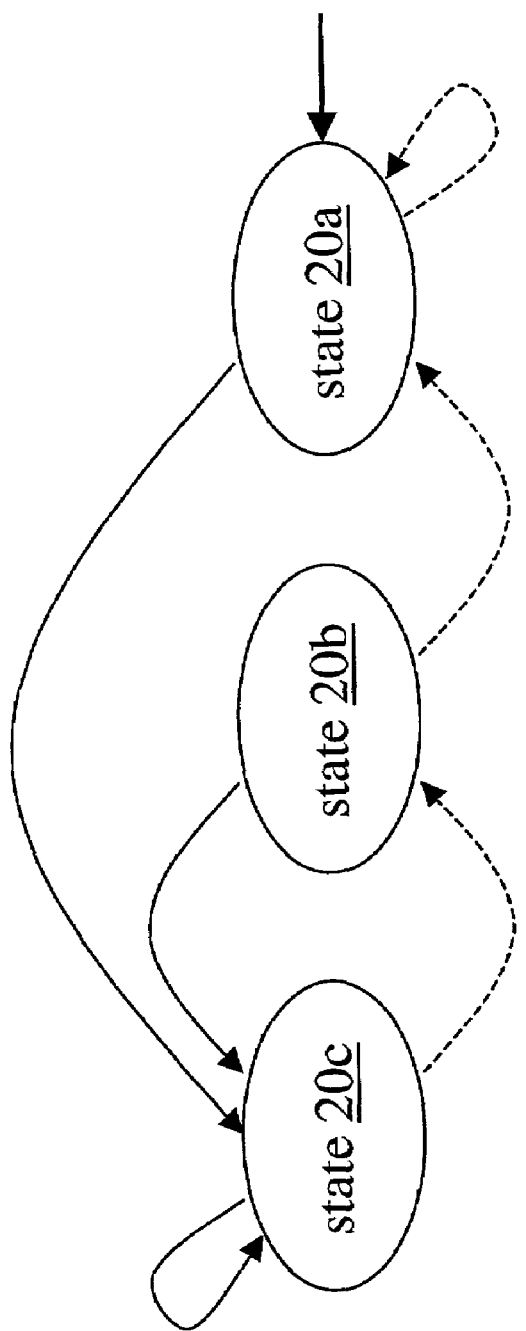
FIG. 11 shows a state diagram.

FIG. 11 shows a state diagram of an exemplary system including a method or apparatus as described herein that provides for delayed recovery of a processing rate. In initial state 20a, the system is configured such that the controlled data operation executes at an unrestricted rate. If an overload condition is detected, the system moves to state 20c, in which the controlled data operation is configured to execute at a reduced rate. If no overload condition is detected, the system remains in state 20a.

In this example, no further states are included, and if an overload condition is detected while the system is in state 20c, the system remains in this state. Otherwise (if no overload condition is detected), the system moves to state 20b, in which the controlled data operation is configured to continue to execute at the reduced rate. If an overload condition is detected while the system is in state 20b, then the system moves to state 20c; otherwise, the system returns to state 20a.

In a further example, a state other than state 20a is the initial state. In another example, a rate of a different data operation, or of more than one data operation, may change from one state to another. In another example, detection of an overload condition when the system is in the most restricted state indicates an error condition that initiates another process.

Figure 12:
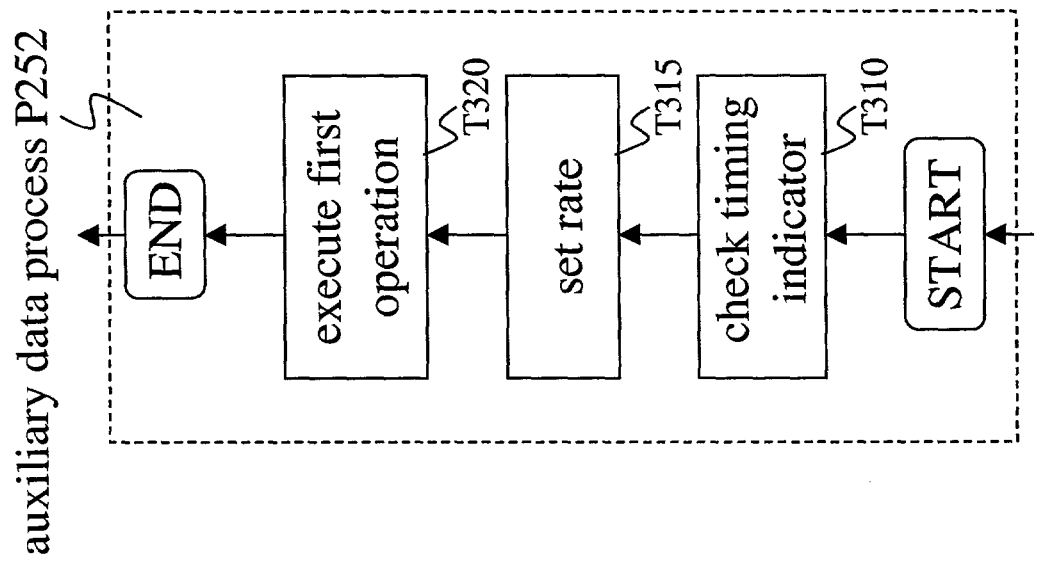
FIG. 12 shows an implementation P252 of auxiliary data process P250.

FIG. 12 shows an implementation P252 of auxiliary data process P250 that includes a task T315. Task T315 sets a rate of the operation of task T320 (and/or a rate of the operation of task T212 of data process P234) according to a result of task T310. In another implementation, task T315 may set such rate or rates according to a state of the status indicator.

Figure 13:
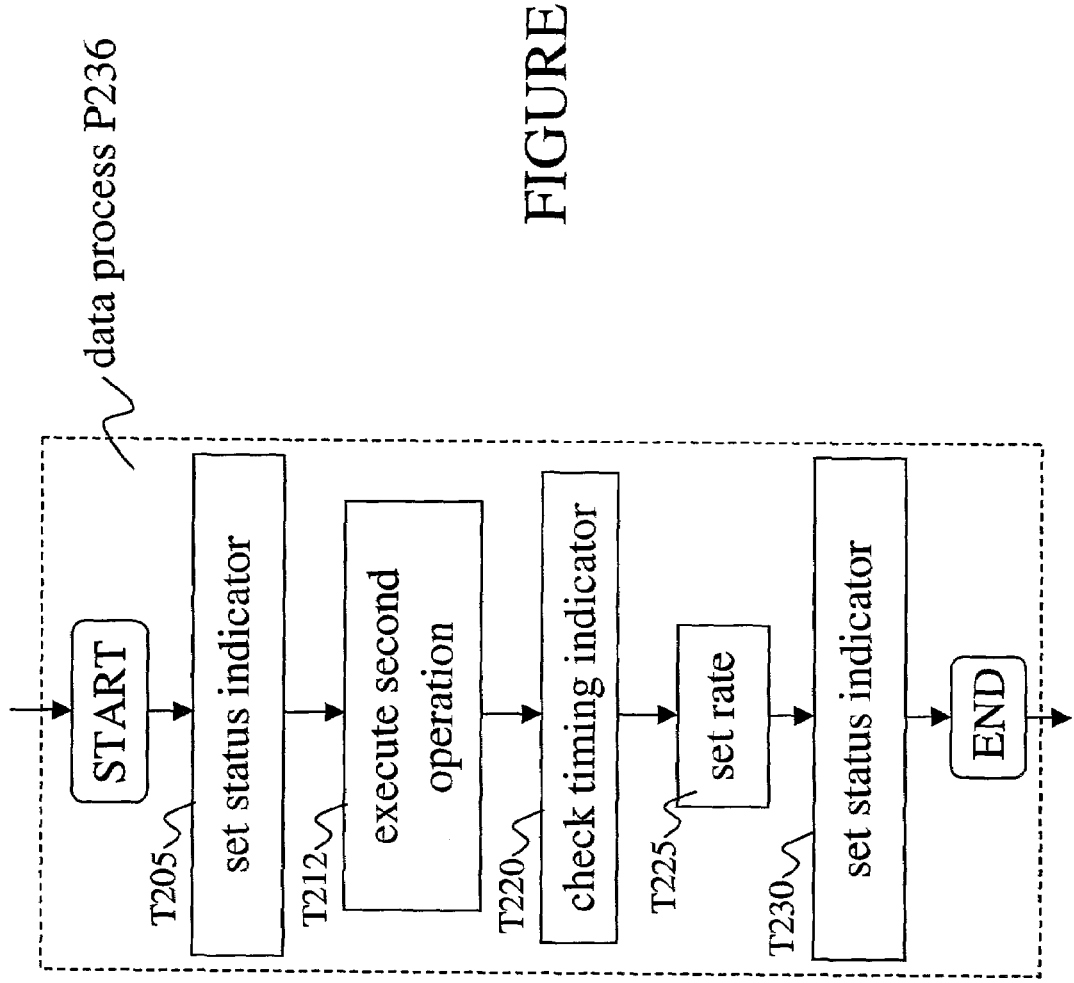
FIG. 13 shows an implementation P236 of data process P234 that includes a task T225.

FIG. 13 shows an implementation P236 of data process P234 that includes a task T225. Task T225 sets a rate of the operation of task T320 of auxiliary data process P250 (and/or a rate of the operation of task T212) according to a result of task T220. In other implementations, task T225 may occur after or concurrently with task T230. In a case where task T225 occurs after task T230, task T225 may set such rate or rates according to a state of the status indicator.

Figure 14:
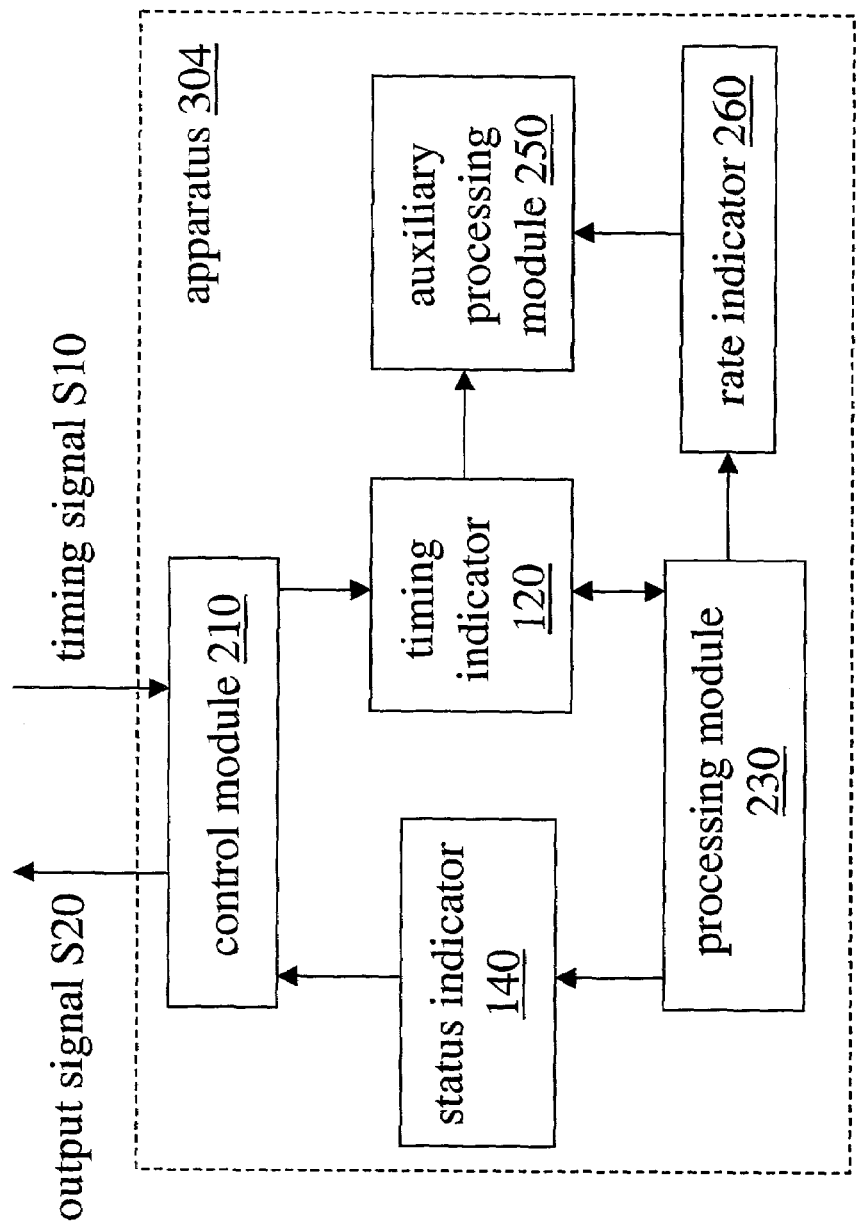
FIG. 14 shows a block diagram for an implementation 304 of apparatus 300.

FIG. 14 shows a block diagram for an implementation 304 of apparatus 300. Apparatus 304 includes a rate indicator 260 and an implementation 232 of processing module 230. Upon completion of a second data operation (e.g. a time-constrained operation), processing module 232 sets a state of rate indicator 260 according to the current state of timing indicator 120. Auxiliary processing module 250 executes a first data operation according to (e.g. at a rate or in a mode indicated by) the state of rate indicator 260. In other implementations, auxiliary processing module 250 may set or reset the state of rate indicator 260, and/or processing module 232 may execute the second data operation according to the state of rate indicator 260.

Rate indicator 260 may include a binary or multi-valued flag accessible to auxiliary processing module 250 and possibly to another process or device. For example, rate indicator 260 may include one or more bits of a status word stored in a processor register or other memory location (which status word may also include timing indicator 120 and/or status indicator 140).

As described herein, a method or apparatus according to an embodiment of the invention may be applied to support the use of a clock source that provides an execution speed lower than a worst-case processing requirement. For example, such a method or apparatus may dynamically reallocate processing cycles between data operations (e.g. from a non-critical operation to a critical operation) upon detection of an overload condition.

The foregoing presentation of the described embodiments is provided to enable any person skilled in the art to make or use the present invention. Various modifications to these embodiments are possible, and the generic principles of detecting an overload condition and of dynamically reallocating processing cycles as presented herein may be applied to other embodiments as well.

For example, the embodiments described above detect the occurrence of an overload condition. In other embodiments, an ongoing process may be monitored to detect a potential overload condition before it occurs. For example, additional checks of the timing and/or status indicator may be performed (e.g. during execution of the time-constrained or second data operation). In one such application, a current machine state or degree of progress may be compared with an expected state or milestone.

An embodiment of the invention may be implemented in part or in whole as a hard-wired circuit or as a circuit configuration fabricated into an application-specific integrated circuit. An embodiment of the invention may also be implemented as two or more processors and/or as applications executing on two or more processors. Thus, the present invention is not intended to be limited to the embodiments shown above but rather is to be accorded the widest scope consistent with the principles and novel features disclosed in any fashion herein.

What is claimed is:

1. A method of process control, said method comprising:
    upon detecting a predetermined feature of a timing signal, setting a state of a timing indicator;
    executing a data process to generate data process results based at least in part on results from a previous executed auxiliary process;
    upon completion of a predetermined stage of said executing, checking the state of the timing indicator; and
    executing an auxiliary process in a predetermined mode of execution to generate results used by a subsequent execution of the data process,
    wherein the mode of execution of the auxiliary process is based on the state of the timing indicator.

2. The method of process control according to claim 1, wherein the mode of execution of the auxiliary process is based on at least one among a previous mode of execution of the auxiliary process and a mode of execution of the data process.

3. The method of process control according to claim 1, wherein the mode of execution of the auxiliary process includes one among a restricted mode and an unrestricted mode, wherein the restricted mode consumes fewer processing cycles than the unrestricted mode.

4. The method of process control according to claim 3, wherein the restricted mode includes at least one of the processes from a set of processes in the unrestricted mode.

5. The method of process control according to claim 1, wherein an interrupt service routine executes upon said detecting a predetermined feature of the timing signal, and
    wherein the interrupt service routine includes said setting a state of the timing indicator.

6. The method of process control according to claim 1, said method further comprising receiving a quantity of speech data,
    wherein executing the data process includes executing a data operation on the speech data.

7. The method of process control according to claim 1, wherein the data process includes one among a compression operation and a decompression operation.

8. The method of process control according to claim 7, wherein the data process includes a vocoding operation.

9. The method of process control according to claim 8, wherein the auxiliary process includes an echo-canceling operation.

10. The method of process control according to claim 9, wherein the echo-canceling operation includes a training process and a canceling process, and
- wherein the mode of execution of the auxiliary process includes one among a restricted mode and an unrestricted mode, and
- wherein in the restricted mode, a level of activity of the training process is substantially restricted as compared to a level of activity of the training process in the unrestricted mode.

11. A processing apparatus comprising:
- a timing indicator;
- a control module configured and arranged to set a state of the timing indicator upon detecting a predetermined feature of a timing signal;
- an auxiliary processing module configured and arranged to execute a first data operation in a predetermined mode of execution;
- a processing module configured and arranged to execute a second data operation based at least in part on results from the first data operation; and
- wherein the processing module is further configured and arranged to check the state of the timing indicator upon completion of a predetermined stage of the second data operation, and
- wherein the predetermined mode of execution is based on the state of the timing indicator.

12. The processing apparatus according to claim 11, wherein the control module is configured and arranged to set a state of the timing indicator upon detecting a specified state transition of the timing signal.

13. The processing apparatus according to claim 11, wherein the predetermined mode of execution is based on at least one among a previous mode of execution of the auxiliary process and a mode of execution of the data process.

14. The processing apparatus according to claim 11, wherein the predetermined mode of execution includes one among a restricted mode and an unrestricted mode.

15. The processing apparatus according to claim 14, wherein the auxiliary processing module is configured and arranged to substantially restrict a level of activity of the first data operation in a restricted mode as compared to a level of activity of the first data operation in the unrestricted mode.

16. The processing apparatus according to claim 14, wherein the auxiliary processing module is configured and arranged to consume substantially fewer processing cycles to execute the first data operation in the restricted mode as compared to the unrestricted mode.

17. The processing apparatus according to claim 14, said apparatus further comprising a status indicator configured and arranged to indicate one among completion and incompletion of the second data operation.

18. The processing apparatus according to claim 17, wherein at least one among the timing indicator and the status indicator includes a location in one among a processor register and a memory.

19. The processing apparatus according to claim 11, said apparatus further comprising a status indicator configured and arranged to indicate a memory location,
- wherein the processing module is further configured and arranged to set a state of the status indicator upon completion of the second data operation.

20. The processing apparatus according to claim 19, wherein the status indicator is configured and arranged to indicate one among a location at which an output of the second data operation is stored and a location at which a default output is stored.

21. The processing apparatus according to claim 11, said apparatus further comprising a status indicator configured and arranged to indicate one among a presence and an absence of an overload condition.

22. The processing apparatus according to claim 11, wherein the second data operation includes one among a compression operation and a decompression operation.

23. The processing apparatus according to claim 22, wherein the first data operation includes an echo-canceling operation.

24. The processing apparatus according to claim 23, wherein the predetermined mode of execution includes one among a restricted mode and an unrestricted mode, and
- wherein the auxiliary processing module is configured and arranged to substantially restrict a training process of the echo-canceling operation in the restricted mode.

25. The processing apparatus according to claim 11, wherein at least one among the processing module and the auxiliary processing module includes an array of logic elements.

26. The processing apparatus according to claim 11, wherein at least one among the processing module and the auxiliary processing module includes a sequence of instructions executable on a programmable array of logic elements.

27. A method of process control, said method comprising:
- transitioning a timing signal at occurrences of a packet data boundary;
- setting a state of a timing indicator upon detecting a predetermined state transition of the timing signal;
- executing a data process on packet data;
- checking a current state of the timing indicator following execution of the data process;
- setting a mode of execution of the data process for subsequent data process execution based at least in part on the current state of the timing indicator.

28. The method of process control according to claim 27, further comprising selectively discarding results of the data process based on the current state of the timing indicator.

29. The method of process control according to claim 27, wherein the mode of execution comprises a compression ratio of a data compression operation.

30. The method of process control according to claim 27, wherein the mode of execution comprises a priority of the data process.

* * * * *